United States Patent
Datar et al.

(10) Patent No.: US 8,375,025 B1
(45) Date of Patent: Feb. 12, 2013

(54) LANGUAGE-SPECIFIC SEARCH RESULTS

(75) Inventors: Mayur Datar, Santa Clara, CA (US); Kedar Dhamdhere, Sunnyvale, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 107 days.

(21) Appl. No.: 12/982,757

(22) Filed: Dec. 30, 2010

(51) Int. Cl.
*G06F 17/30* (2006.01)

(52) U.S. Cl. ........ 707/727; 707/706; 707/722; 707/723; 707/724; 707/725; 707/726; 707/728; 707/731; 707/732; 707/735; 707/736; 707/758; 707/781; 718/100

(58) Field of Classification Search .......... 707/706, 707/722, 723, 724, 725, 726, 727, 728, 731, 707/732, 735, 736, 758, 781, 999.003, 999.004, 707/999.005; 718/100
See application file for complete search history.

(56) References Cited

U.S. PATENT DOCUMENTS

| | | | |
|---|---|---|---|
| 2004/0194099 A1* | 9/2004 | Lamping et al. | 718/100 |
| 2006/0161543 A1* | 7/2006 | Feng et al. | 707/5 |

* cited by examiner

*Primary Examiner* — Syling Yen
(74) *Attorney, Agent, or Firm* — Fish & Richardson P.C.

(57) ABSTRACT

Methods, systems and apparatus, including computer program products are described for ranking content items identified by a search engine and delivering corresponding search results. In one aspect, search engine user language preference data is stored in association with user content item selection records. Analysis of the records is performed to identify content items that appeal to users having common language preferences. Query results can be ranked based on the language preference of the current user and/or the user's query and data derived from the selection records.

17 Claims, 6 Drawing Sheets

LANGUAGE-SPECIFIC SEARCH RESULTS

BACKGROUND

This specification relates to improving language-specific search results provided by a search engine.

Search engines accept query parameters including search words or phrases and return information identifying one or more results. Each result is a content item (e.g., a word processing document, a web page, a text file, an image, a multimedia file, or the like) that matches the query parameters. The content items are generally identified by searching an index of available items for ones that match the query parameters. In the case of an Internet search engine, the index covers a large number of content items, many of which are hypertext documents on the world wide web (the "web"). Information about the content items is collected from servers that host the content items in numerous countries and have content in many different languages.

A search engine can implement a number of strategies for ranking identified results. For example, a search engine user may specify a preferred language in which the user prefers identified results to be written. The user's preference can be specified explicitly, in a query parameter, for example, or in profile information provided by the user. Based on the preferred language, the ranking of identified results can be modified to return documents or other content items corresponding to the specified language.

SUMMARY

This specification describes technologies related to using language preference information in selecting or ranking search query results for presentation to a user of a search engine.

In general, one innovative aspect of the subject matter described in this specification can be embodied in methods that include the actions of storing language content correspondence data that represents correspondences between user language preferences and content item selections; generating language statistics for content items based on the stored language content correspondence data; receiving a search query from a user device; determining a query language preference for the search query; generating a ranking of results satisfying the query, the ranking based at least in part on the query language preference and the language statistics of the content items; and sending data identifying the ranked results to the user device in response to the search query. Other embodiments include corresponding systems, apparatus, and computer program products.

The foregoing and other embodiments can each optionally include one or more of the following features, alone or in combination. The content items are accessible over the Internet using uniform resource locators each specifying a domain; and the language statistics are aggregated based on the domains corresponding to the content items. The content items comprise web pages. A content item index is updated with the language statistics. The language content correspondence data comprises user language preference data linked to content item presentation records; and the language selection statistics are further generated from the content item presentation records. A content item presentation record includes a record of the display of a reference to a content item to a user having the opportunity to select the content item using the representation. Generating ranked results includes computing a language selection weight for each of a plurality of content items, and the rank of a given content item is based on a ranking score based at least in part on the language selection weight of the given content item. The language selection weight of a given content item is proportional to a percentage of total users selecting the content item having a language preference matching the query language preference. Computing the language selection weight of a given content item includes applying a factor based on a percentage of users having a language preference matching the query language preference who selected the content item upon being presented with an opportunity to do so by a search engine. The language selection weight is computed according to be bias1+(A·bias2)+(B·bias3), where A is a percentage of the total users that clicked on a content item that has a language preference matching the query language preference; B is a click through percentage of the content item for users having a language preference matching the query language preference; and bias1, bias2, and bias3 are bias values.

Particular embodiments of the subject matter described in this specification can be implemented to realize one or more of the following advantages. Results provided to a search engine user can include results in the preferred language of the user as well additional results that are in a different language, where the results are likely to be of interest to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
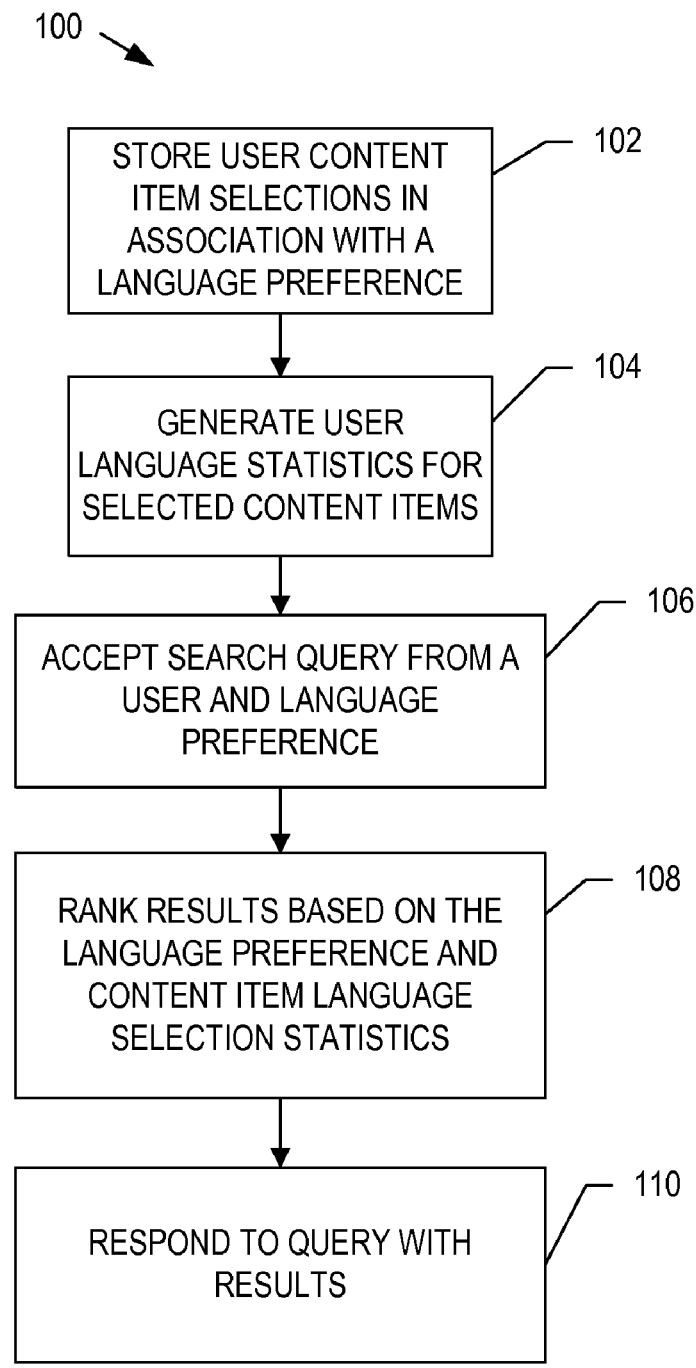
FIG. 1 is a flowchart of an example method for providing search results based on language selection statistics.

FIG. 1 is a flowchart of an example method 100 for providing search results based on language selection statistics. The method 100 is described with reference to an example search engine implementing the method. The search engine can be implemented on one or more computers operating in one or more locations. The search engine can interact with users over a network, e.g., the Internet. Users can interact with the search engine using a user interface provided by the search engine to a user device, e.g., user interface web pages provided to user computing devices, for example, personal computers, smart phones, or personal digital assistants.

The search engine stores data identifying selections by users of particular content items from among search results with data identifying any indicated language preference of the users making the selections (102). For example, the search engine can store records of selections made by many users of the search engine, e.g., records in a click log identifying content items selected by users from a list of search results. The search engine may provide users with an opportunity to opt in or opt out of features that may collect the personal information. In addition, the data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

Each recorded selection can include an indication of a language preference of the user that made the selection. A user language preference may have been indicated implicitly or explicitly. An implicit indication can be made, for example, by the use of a particular language in the submitted query preceding the recorded selection, or a pattern of using a particular language in submitted queries. An explicit indication can include, for example, a user selection of a check box or other user-generated input indicating a language preference that is submitted with a query, a language preference stored in a web browser cookie, or a language preference stored in association with a user's search engine account, e.g., in a profile maintained by the user. The user profile information may be anonymized, as described above. Other implicit and explicit indications can also be used. In some implementations, the language preference may be stored with a record of the selection (e.g., in a click log), or linked to such a record.

The search engine generates user language statistics for content items selected by users (104). For example, the search engine can aggregate the language preference data from the selection records (e.g., click logs) to create language preference statistics for a given content item. The statistics can be maintained for individual content items, for groups of content items based on network addresses of the content items, or both. For example, selection statistics can be aggregated across an Internet domain for all content that is located in that domain.

The search engine receives a search query request from a user and determines a query language preference (106). The query language preference can be received from the user with the query or it can be determined from information about the user maintained by the search engine, as described above. The query language preference can be specific to the query, or it can be a preference associated with the query because it is a language preference of the user issuing the query. The language preference can be indicated implicitly or explicitly, as described above.

The search engine ranks a set of search results for the query based on the query language preference and the previously-stored content item language statistics (108). The content item language statistics can be used by the search engine to identify content items in another language that are likely to be of interest to users having a given language preference.

Some content items will have an associated language. For example, a web crawler application may be able to assign a language to an indexed web page based on the language used in the content of the web page. In many cases, language statistics for such a web page will indicate that the user language preferences of users clicking on that web page overwhelmingly correspond to the language used in the page content. The language selection statistics for that web page can further indicate, however, that users having language preferences that are not the same as the language of the web page content often visit the web page. This can occur, for example, where users are multilingual and the content of the page appears in a language that is understood by the users, although it is not their indicated preferred language. For example, users who speak Hindi may also be found, with some frequency, to speak English and to be interested in the content of a given page even though it is written in English. Interest in the content of the page by users having a Hindi language preference (indicated implicitly or explicitly) can be determined from aggregate statistics collected for the page from, for example, click logs, as described above. The content of the page can be valuable to users having a Hindi language preference despite the fact that it is written in a language other than the users' preferred language.

Other examples of content written in one language that may be of interest to users having a different language preference include software websites, or sites that include images, audio, video, or other forms of media.

A set of ranked results generated by the search engine will generally include content items that have language statistics indicating that users who have previously selected those content items have a language preference matching the query language preference. Where the statistics for a given content item show interest by users having a language preference matching the query language preference, that content item's ranking score, and therefore possibly the item's place in the ranking order of the search results, can be elevated.

The search engine responds to the query with search results (110). For example, a list of ranked results (i.e., results in ranked order) or a user interface document (e.g., a web page) presenting the results in ranked order can be sent to the user device for display to a user.

Figure 2:
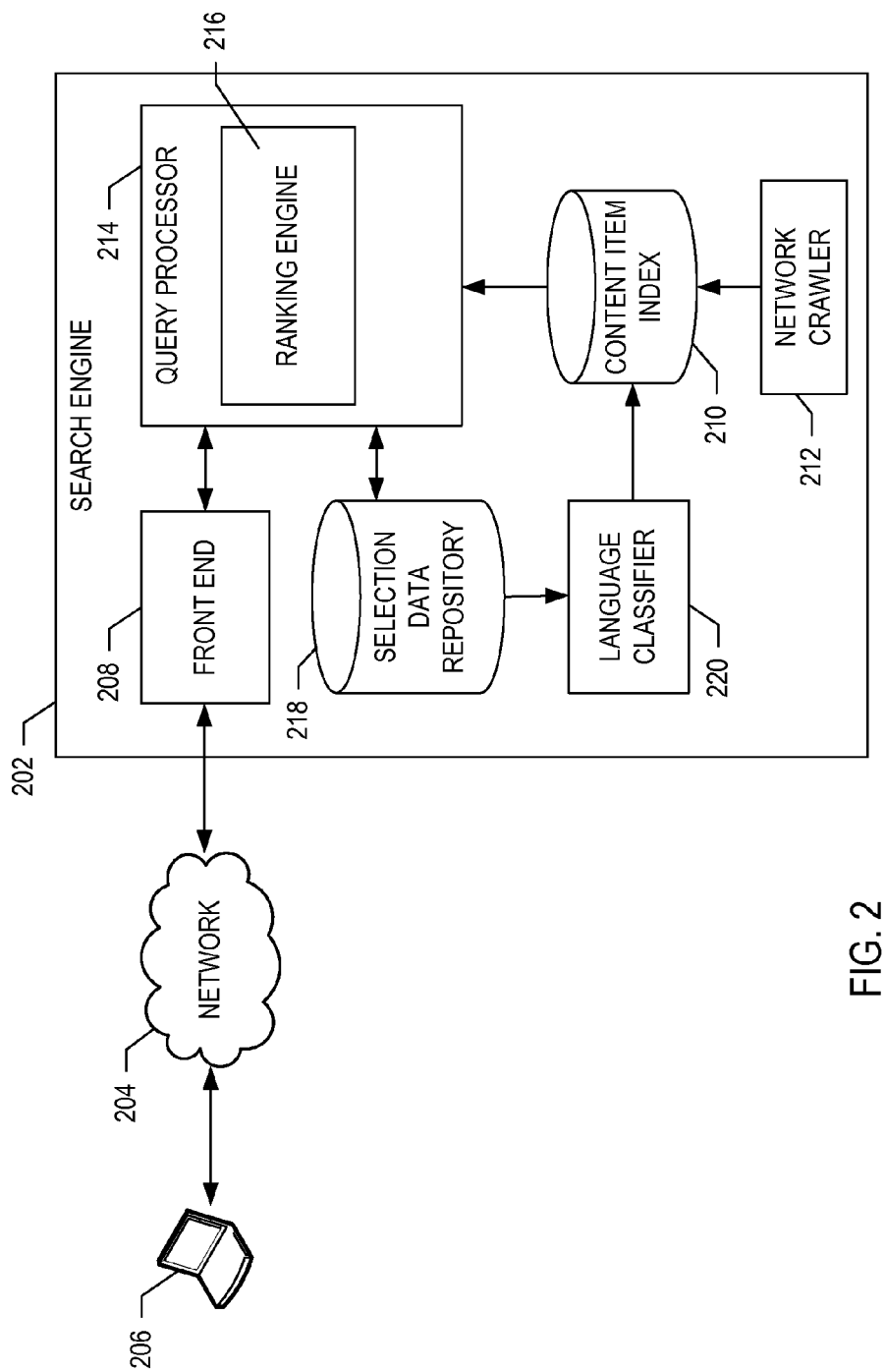
FIG. 2 is a block diagram of an example network environment of a search engine for providing search results based on language selection statistics.

FIG. 2 is a block diagram of an example network environment of a search engine 202 for providing search results based on language selection statistics. The search engine 202 and each of its components can be implemented as computer programs running on one or more computers operating in one or more locations. A user of the user device 206 (e.g., a personal computer, smart phone, or personal digital assistant) can access a front end 208 of the search engine 202 over the network 204. For example, the user can direct web browser software running on the user device 206 to a network address of the search engine 202, and the front end 208 can respond by transmitting one or more web-based user interface pages to the web browser for display to the user. The search engine 202 can accept queries from the user device 206 and respond with a web page that include search results.

To facilitate identification of search results responsive to queries, the search engine 202 indexes content available on the network 204 for later identification and retrieval of search results that satisfy user queries. The data identifying each search result for the user can include, for example, a title, a snippet of text extracted from the result, and a hypertext link to the result. The presentations of results may be grouped into a predetermined number of search results (e.g., ten) on each user interface page.

A user can submit multiple search queries to the search engine 202 in one search session. A search session can be identified by the search engine 202 in one or more of a number of ways. For example, a search session can be defined by a period of time between queries. For example, if a particular user device 206 submits a query, a current search session can be initiated. The current search session can be terminated when the search engine 202 has not received further queries from the user for a predetermined period of time (e.g., 5 or 10 minutes). A search session can also be defined by a user indicating a beginning and an end of a search session (e.g., by logging into the search engine and logging out of the search engine). A search session can also be identified when a relationship exists between a newly received search query and previously received search queries from the same user, so that the newly and previously received search queries are identified as belonging to the same session. The newly and previously received search queries may be limited to queries received in a time window of predetermined size, e.g., 10 or 30 minutes or one or two hours. The newly and previously received search queries may be limited to queries that are not separated by a query that does not share the relationship. Other ways of identifying and tracking a search session can also be used.

Results matching the query can be identified by searching a content item index generated from content items collected by a network crawler 212, e.g., a web crawler. A query processor 214 of the search engine 202 can receive the query from the front end 208, identify and rank a set of content items using the content item index 210 and the ranking engine 216, and send data identifying the results to the front end 208 for transmission to the user device 206.

The search engine 202 can use query and content information to generate a ranking score to rank the search results. The ranking score can be computed from information indicating how well each result satisfies or matches the query, from information indicating a level of query-independent quality of each result, or both.

User selections of one or more content items from among the presented results can be recorded by the search engine 202 and stored in a selection data repository 218. User selections can be recorded anonymously. The user language preference associated with a given user selection can be stored, for example, in a record in which a recorded user selection is recorded. Alternatively, data linking the language preference and the record of the user selection can be stored. For example, a user selection of a given content item can be stored with a language preference of "French" based on an explicit or implicit language preference indicated by a user making the selection.

The search engine 202 can collect selection data for many queries from many users. For example, user content item selections made by users upon being presented with query results can include an identifier, e.g., a URL (Uniform Resource Locator), of the content item selected and the corresponding language preference of those users can be recorded. The search engine can generate, from the collected data, language selection statistics for the content items represented in the content item index 210. For example, a language classifier 220 can aggregate the language preference statistics stored in the selection data repository 218 and use this aggregated data to update the content item index 210. The ranking engine 216 can then use these statistics and a language preference of a query submitted by a user to rank content items satisfying the query. For example, in generating a ranking score for a given content item, a weight based on the language selection statistics for that content item and a language preference for the subject query can be included in the ranking score calculations to increase and/or decrease the ranking score of a content item.

Figure 3:
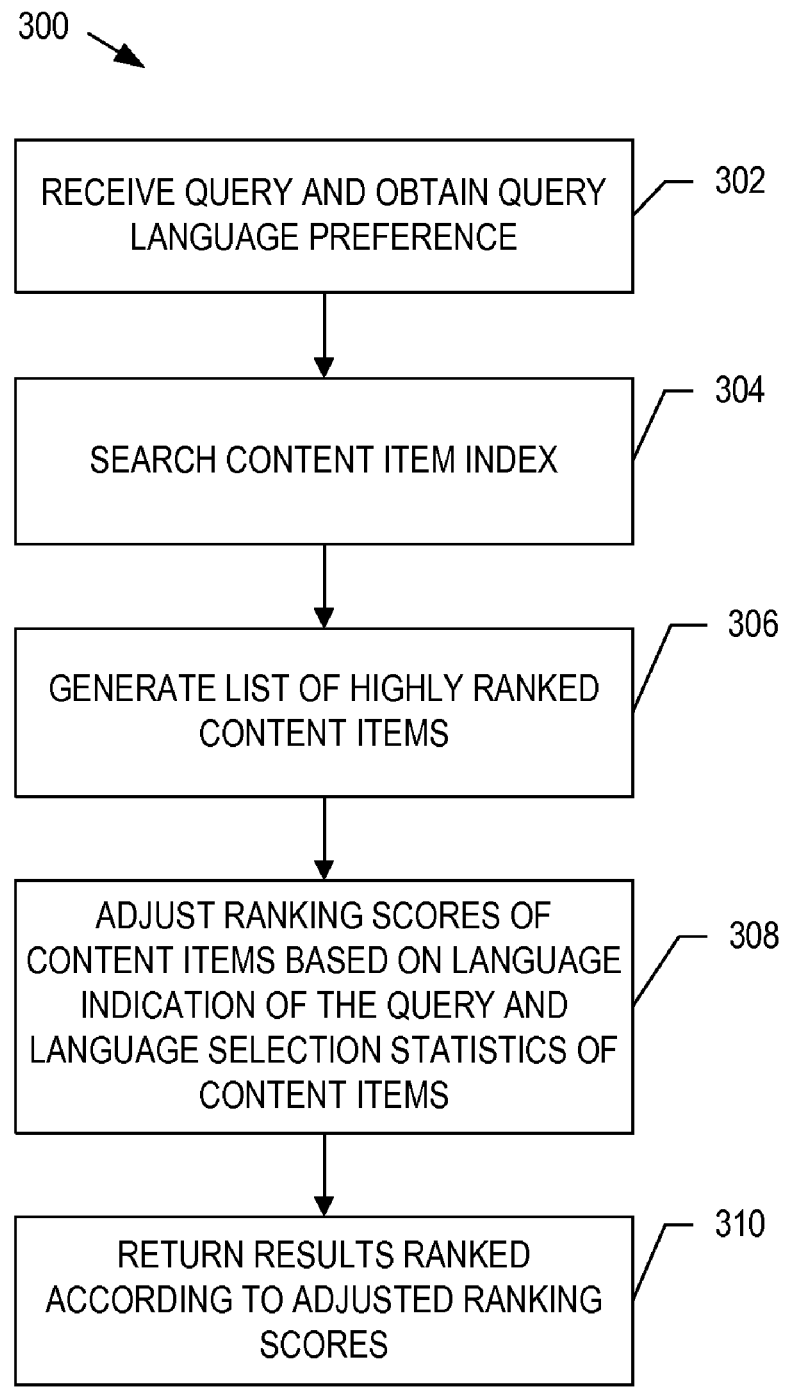
FIG. 3 is a flowchart of an example method for providing search results and using language selection statistics to adjust content item ranking scores.

FIG. 3 is a flowchart of an example method 300 for providing search results and using language selection statistics to adjust content item ranking scores. A system implementing the method 300 receives a query and obtains a query language preference (302). The preference can be obtained from the query or from data maintained by the system. The system searches a content item index (304), and generates a list of highly ranked content items responsive to the query (306).

The system can then adjust the ranking scores (i.e., adjust the scores that determine the relative positions) of the content items based on the query language preference and the language selection statistics of the content items (308). This can be done, for example, by generating a weight for each content item based on the language selection statistics for the respective content item and a language preference for the query. Each weight can, for example, multiply an initial ranking score to increase and/or decrease the score of a content item. For instance, if a language preference of a query is Hindi, content items, in English, for example, that have user selection statistics indicating strong interest by other Hindi users can have increased scores (and therefore possibly increased rank positions) relative to content items with selection statistics that do not show this interest by Hindi users.

Data identifying the results and their ranked order according to the adjusted ranking scores, e.g., in a search results web page, is returned to the user device that sent the query (310).

Figure 4:
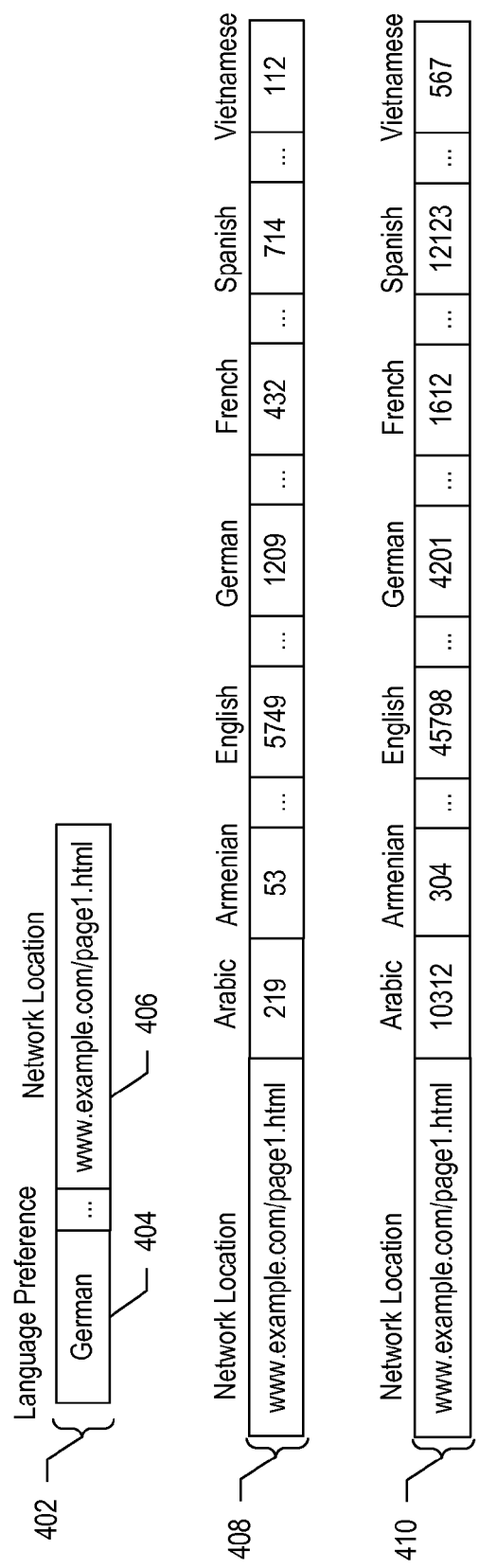
FIG. 4 illustrates a set of example records that can be used in providing search results based on language selection statistics.

FIG. 4 illustrates a set of example records that can be used in providing search results based on language selection statistics. The first example record 402 illustrates a recording scheme where the language preference 404 is stored in a selection record with a content item identifier, such as the network location (in this case a URL) 406.

The next example record 408 illustrates aggregate language-specific selection statistics compiled from selection records for the web page content item located at the URL www.example.com/page1.html. The example statistics include selection counts that, for example, correspond to the number of times that users having the corresponding language preference selected the web page for viewing when presented with the opportunity to do so in a list of search results.

The next example record 410 illustrates additional language-specific selection statistics compiled from selection records for the web page content item located at the URL www.example.com/page1.html. The example statistics include a count of content item presentations corresponding to the number of times that users having the corresponding language preference were presented with the opportunity to select the web page for viewing, e.g., in a list of query results.

In some implementations, the selection data repository 218 includes a browsing history for users of the search engine, and browsing activity records can be used alone or in combination with selection records to generate language-specific statistics for a given content item. Users may be provided with an opportunity to opt in or opt out of the collection of browsing history or other features that may collect the personal information. In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user. Finally, the collected data may be deleted after a predetermined period of time.

Language selection statistics can be used in ranking content item search results for search engine queries. For example, a language selection weight can be computed for content items and used as part of a ranking method for ranking content items to be returned as results to a search engine user. In some implementations, a language selection weight is computed for each content item in a collection of initially ranked results. The computed weight can then be multiplied by the initial ranking scores of corresponding content items to generate modified ranking scores.

In some implementations, the language selection weight is calculated according to the formula:

Language Selection Weight=bias1+($A$·bias2)+ ($B$·bias3)

where bias1, bias2, and bias3 are biasing factors for the language selection weight that can be determined experimentally and/or through machine learning techniques in order for application of the language selection weight to achieve a desired ranking adjustment behavior.

A in the formula is defined as:

$$A = \frac{\text{Number Users with Language Preference } X \text{ that Click on Content Item } Y}{\text{Total number of Users that Click on Content Item } Y}$$

and B is defined as:

$$B = \frac{\text{Number Users with Language Preference } X \text{ that Click on Content Item } Y}{\text{Total Number of Times Content Item } Y \text{ is Presented to Users with Language Preference } X}$$

For a given query, A and B are calculated based on the language preference of the query. That is, "Language Preference X" is the query language preference, if there is one, or the language preference of the user to whom Content Item Y is presented. "Content Item Y" is the content item to which the language selection weight will be applied.

A is a percentage of the total users clicking on the content item that have a language preference matching that of the querying user.

B is a click through percentage of the content item for users that have the same language preference as that of the query. In some implementations, 0.05 is the value of bias1, 5 is the value of bias2, and 2 is the value of bias3.

Using language selection weights can provide a list of results whose ranking is based, at least in part, on the interest level of other users that have the same language preference as the query language preference. Thus, content items, e.g., web pages, that are categorized as using a language different from the user's preferred language may appear in a highly ranked position in search results depending on the selection statistics of other users having the same language preference.

Figure 5:
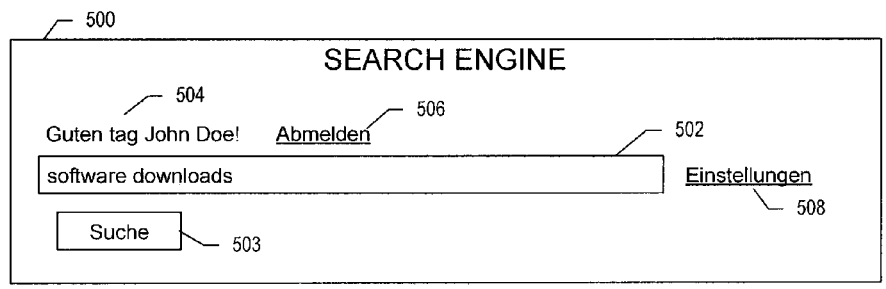
FIG. 5 illustrates an example web page form for entering a search query.

FIG. 5 illustrates an example web page form 500 for entering a search query as displayed by a web browser running on a user device, e.g., a personal computer or Internet enabled mobile telephone. A personal greeting 504 indicates that user John Doe (having an example username johndoe123) logged into the search engine so that the search engine can use any previously saved preferences. By selecting the sign out link 506, the user can log out of the search engine. The greeting 504 and other user interface elements are in German because, in this example, John Doe previously indicated a German language preference. Such a preference can be indicated, for example, by selecting the preferences link 508 and selecting a checkbox to indicate a language preference, or by selecting a German site of the search engine. The phrase "software downloads" (a phrase common in both German and English language documents) is shown in the search query field 502 as an example search term entered by the user John Doe. When the user selects the search button 503, the browser sends the search query to the search engine. The search engine can respond by searching an index of content items to retrieve a list of content items based on the search term, the language preference of the query (in this case an explicitly-indicated user preference of German), and language-specific statistics for the content items indexed by the search engine.

Figure 6:
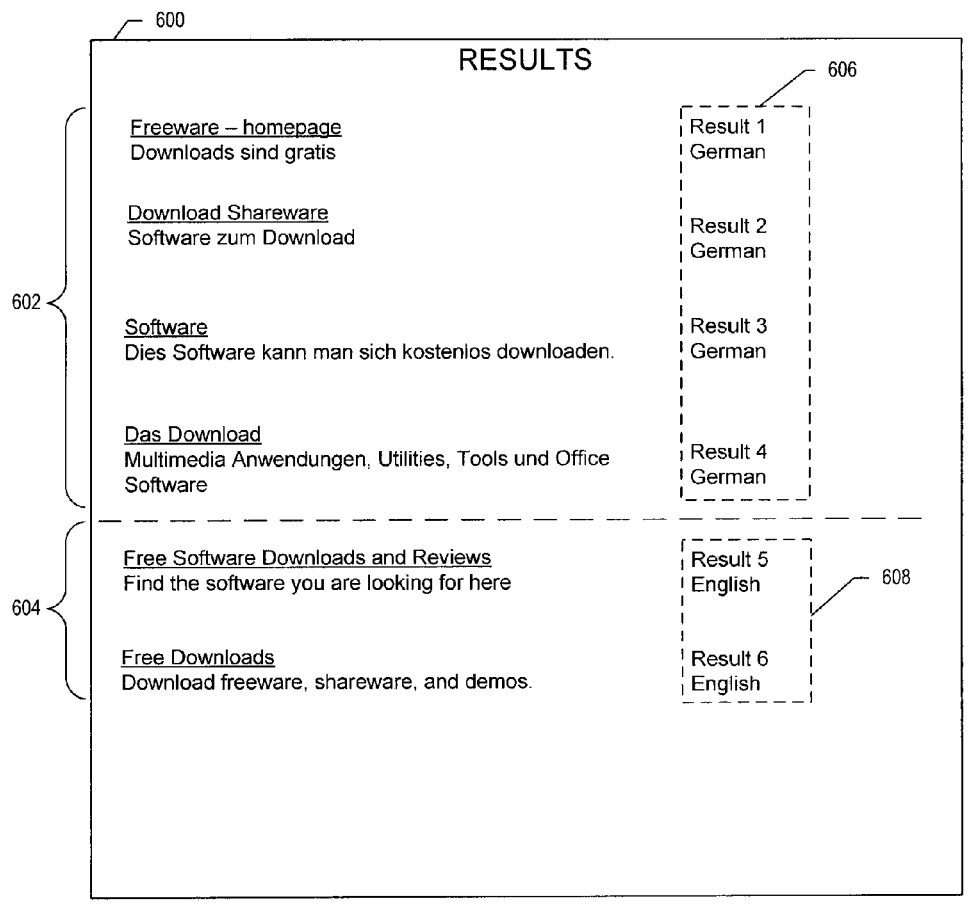
FIG. 6 illustrates an example results web page including a preferred language results section and an other-language results section.

FIG. 6 illustrates an example results web page 600 including a preferred language results section 602 and an other-language results section 604. The example results shown correspond to a search for "software downloads" from a user indicating a German language preference. The results section 602 identifies a set of German language results, i.e., results identified as having German language content (identified as German, for example, by a crawling application that indexed the corresponding content). This is indicated in FIG. 6 by the language designations 606, 608. The language designations 606, 608 would generally not appear on a results page, but are included here for purposes of explanation. The results in section 602 can, for example, be top ranked results from a search for results in the user's preferred language.

The other-language results section 604 can be provided to present results in other languages. A portion of the results page is shown as being reserved for one or more results for which the language selection statistics show a high degree of interest by users with the same language preference as the querying user. For example, the other-language results section 604 can exclude results categorized (by a crawler application, for example) as having the same language as the user's preferred language, and include one or more highest ranked results in another language based on ranking scores calculated using language selection statistics, e.g., as described above. For example, a language selection weight can be used in ranking content item results not categorized as having the same language as the language preference of the query, and some highest ranked number of these content items can be presented to the user in the other-language results section 604.

In the example shown, the results in the other-language results section 604 are categorized as English results (categorized as English, for example, by a crawling application that indexed the corresponding content), but could be categorized as any language as their inclusion or exclusion on the results page is not based on the content's language categorization, but rather on collected language selection statistics for the content item.

Figure 7:
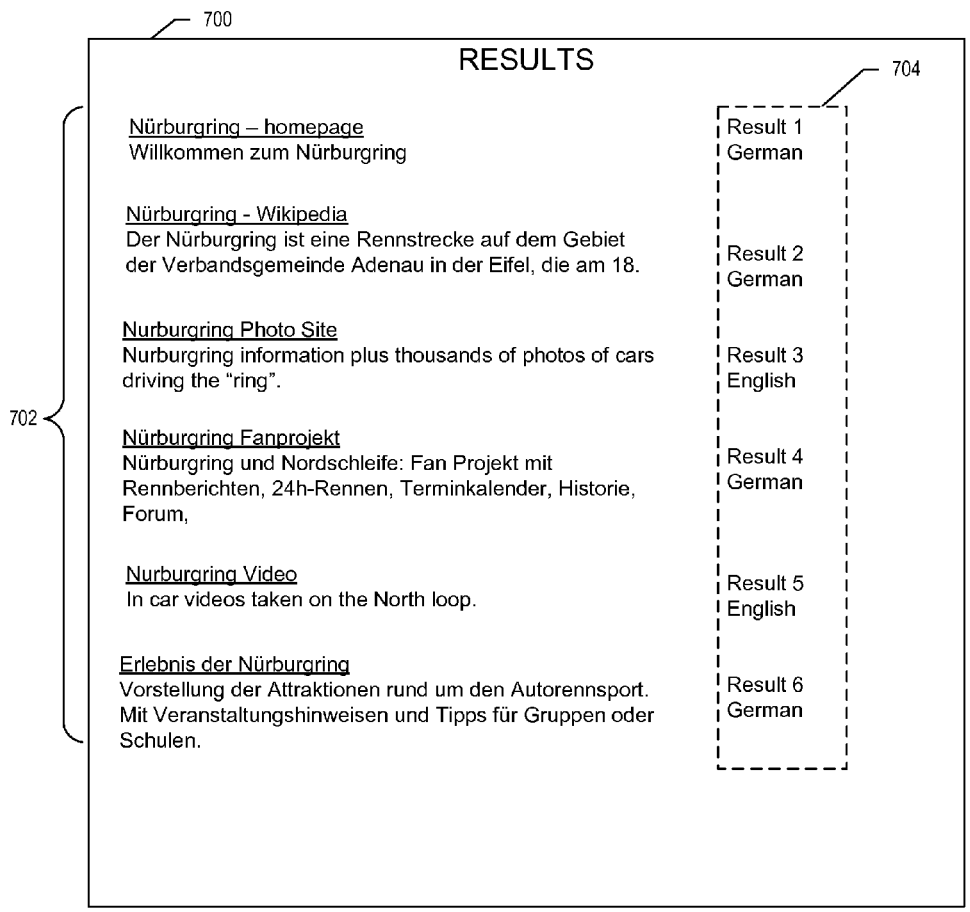
FIG. 7 illustrates an example results web page including intermingled results.

FIG. 7 illustrates an example results web page 700 including intermingled results 702. The example results shown can correspond to a search for "nurburgring" (the Nürburgring is a race track in Germany) with a German language preference. The results section 702 includes four German language results and two English language results. The language designations 704 would generally not appear on a results page, but are included here for purposes of explanation. The results 702 can be, for example, top ranked results that include results from the user's preferred language and results in other languages and having, for example, a sufficiently large number or percentage of visitors that share the querying user's preferred language. As described above, a language selection weight can be used in ranking content items and some highest ranked number of these content items can be presented to the user. Interest in given content items by users having the same language preference as that of the query (as indicated implicitly or explicitly) can, for example, cause content items not categorized as matching the language preference of the query to increase in rank. An increase in rank can be realized, for example, through calculation of language selection weights and their application to an initial ranking score of the content items.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a one or more computer-readable storage devices for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
storing language-content correspondence data that represents correspondences between user language preferences and user selections of content items, wherein the language-content correspondence data includes a respective selection count and a respective presentation count for each combination of one of a plurality of content items and one of a plurality of languages, wherein each selection count corresponds to a number of times that users having a preference for a particular language selected a particular content item when presented with the opportunity to select the particular content item, and wherein each presentation count corresponds to a number of times that users having a preference for a particular language were presented with an opportunity to select a particular content item;
generating language statistics for content items based on the stored language-content correspondence data;
receiving a search query;
obtaining a query language preference for the search query;
using the language statistics to generate a ranking of results satisfying the query, the ranking based at least in part on the query language preference for the search query and the language statistics of content items identified by the results; and
providing the ranked results in response to the search query.

2. The method of claim 1, wherein:
the content items are accessible over the Internet using uniform resource locators each specifying a domain; and
the language statistics are aggregated based on the domains corresponding to the content items.

3. The method of claim 1, further comprising updating a content item index with the language statistics.

4. The method of claim 1, wherein:
the language-content correspondence data comprises user language preference data linked to content item presentation data; and
the language selection statistics are further generated from the content item presentation data.

5. The method of claim 4, wherein the content item presentation data comprises a record of the presentation of a reference to a content item to a user having the opportunity to select the content item using the reference.

6. The method of claim 1, wherein using the language statistics to generate the ranking of results comprises computing a language selection weight for each of a plurality of content items, wherein the language selection weight is based on a query language preference of the search query and respective selection counts for a particular language matching the query language preference for each of the plurality of content items, wherein the rank of a given content item is based on a ranking score that is based at least in part on the language selection weight of the given content item.

7. The method of claim 6, wherein computing the language selection weight of a given content item includes applying a factor based on a percentage of users having a language preference matching the query language preference who selected the content item upon being presented with an opportunity to do so by a search engine.

8. The method of claim 6, wherein the language selection weight for each of the plurality of content items is computed according to:

$$\text{language selection weight} = \text{bias1} + (A \cdot \text{bias2}) + (B \cdot \text{bias3})$$

wherein:
A is a percentage of the total users clicking on the content item having a language preference matching the query language preference;
B is a click through percentage of the content item for users having a language preference matching the query language preference; and
bias1, bias2, and bias3 are biasing factors.

9. A system comprising:
one or more computers and one or more storage devices;
wherein the one or more storage devices store language-content correspondence data that represents correspondences between user language preferences and user selections of content items, wherein the language-content correspondence data includes a respective selection count and a respective presentation count for each combination of one of a plurality of content items and one of a plurality of languages, wherein each selection count corresponds to a number of times that users having a preference for a particular language selected a particular content item when presented with the opportunity to select the particular content item, and wherein each presentation count corresponds to a number of times that users having a preference for a particular language were presented with an opportunity to select a particular content item; and
wherein the one or more storage devices store instructions that, when executed by the one or more computers, cause the one or more computers to perform operations comprising:
generating language statistics for content items based on the stored language-content correspondence data;
receiving a search query;
obtaining a query language preference for the search query;
using the language statistics to generate a ranking of results satisfying the query, the ranking based at least in part on the query language preference for the search query and the language statistics of content items identified by the results; and
providing the ranked results in response to the search query.

10. The system of claim 9, wherein the operations further comprise:
storing in the one or more storage devices language-content correspondence data that represents correspondences between user language preferences and user selections of content items; and
generating the language statistics for content items based on the stored language-content correspondence data.

11. The system of claim 9, wherein:
the content items are accessible over the Internet using uniform resource locators each specifying a domain; and the language statistics are aggregated based on the domains corresponding to the content items.

12. The system of claim 9, wherein the operations further comprise updating a content item index with the language statistics.

13. The system of claim 9, wherein:
the language-content correspondence data comprises user language preference data linked to content item presentation data; and
the language selection statistics are further generated from the content item presentation data.

14. The system of claim 13, wherein the content item presentation data comprises a record of the presentation of a reference to a content item to a user having the opportunity to select the content item using the reference.

15. The system of claim 9, wherein using the language statistics to generate the ranking of results comprises computing a language selection weight for each of a plurality of content items, wherein the language selection weight is based on a query language preference of the search query and respective selection counts for a particular language matching the query language preference for each of the plurality of content items, wherein the rank of a given content item is based on a ranking score that is based at least in part on the language selection weight of the given content item.

16. The system of claim 15, wherein computing the language selection weight of a given content item includes applying a factor based on a percentage of users having a language preference matching the query language preference who selected the content item upon being presented with an opportunity to do so by a search engine.

17. The system of claim 15, wherein the language selection weight for each of the plurality of content items is computed according to:

$$\text{language selection weight} = \text{bias1} + (A \cdot \text{bias2}) + (B \cdot \text{bias3})$$

wherein:
A is a percentage of the total users clicking on the content item having a language preference matching the query language preference;
B is a click through percentage of the content item for users having a language preference matching the query language preference; and
bias1, bias2, and bias3 are biasing factors.

* * * * *